Jan. 17, 1939.   E. C. HUSTON   2,144,571
AUTOMATIC SIGNAL SWITCH FOR AUTOMOBILES
Filed Dec. 3, 1937   2 Sheets-Sheet 1
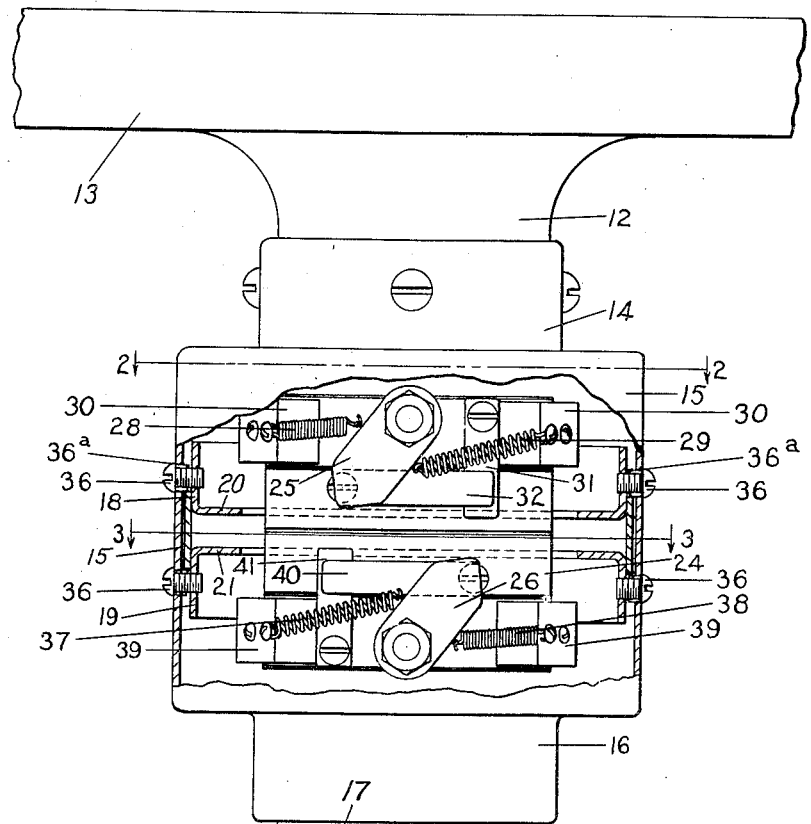
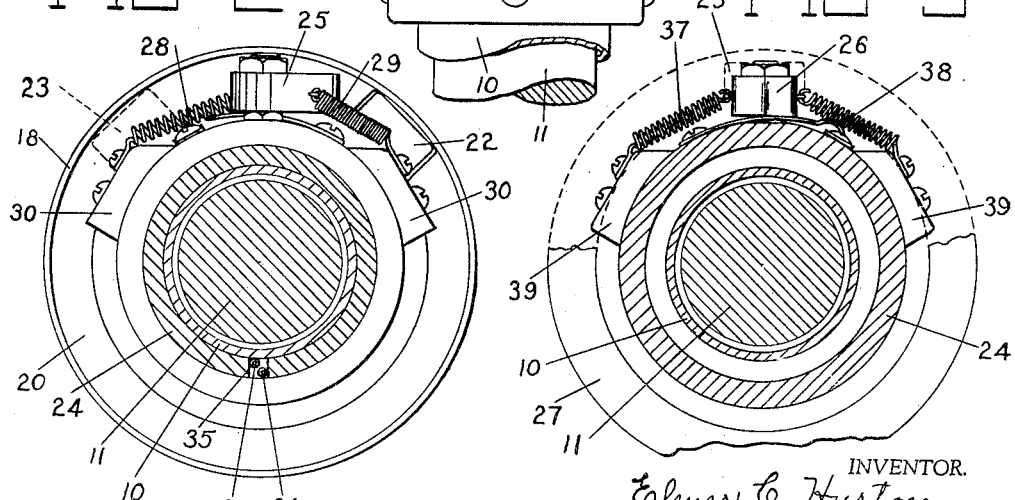
INVENTOR.
Elmer C. Huston,
BY Walter N. Haskell,
his ATTORNEY.

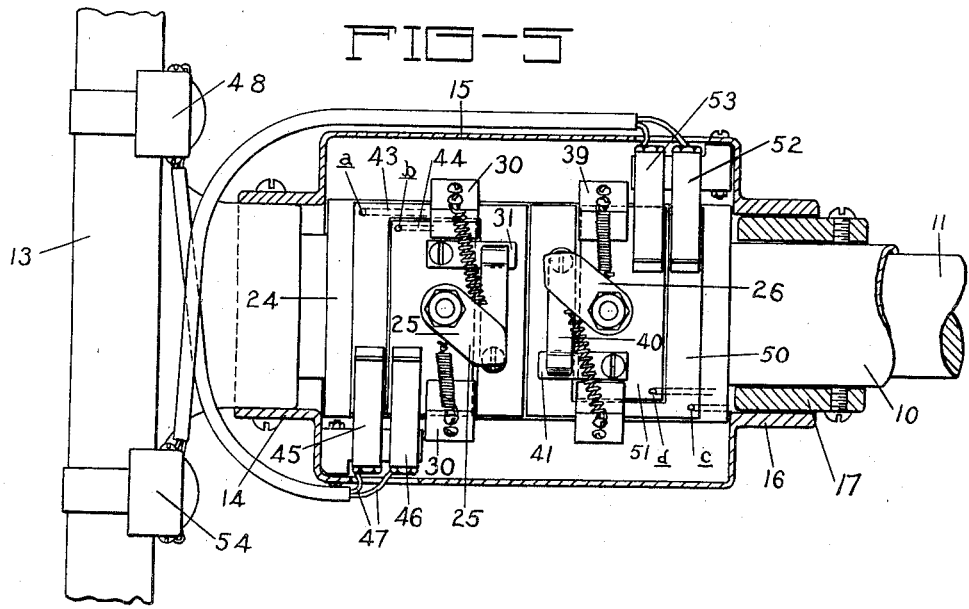
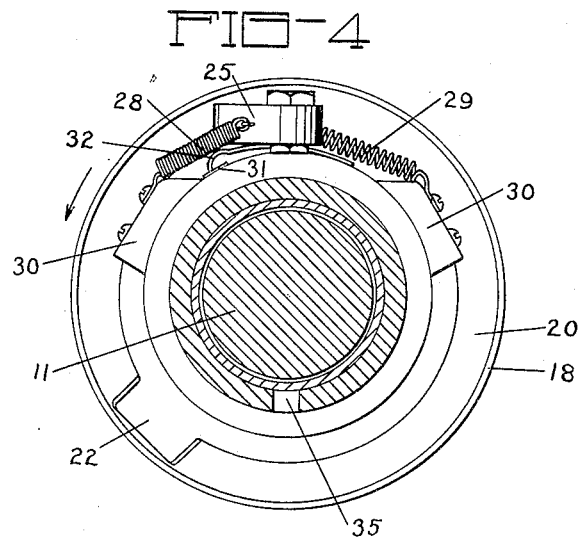

Patented Jan. 17, 1939

2,144,571

UNITED STATES PATENT OFFICE 2,144,571

AUTOMATIC SIGNAL SWITCH FOR AUTOMOBILES

Elmer C. Huston, Moline, Ill.

Application December 3, 1937, Serial No. 177,909

5 Claims. (Cl. 200—59)

My invention has reference to an automatic signal for automobiles, and has for its purpose to provide a means for indicating that the vehicle is going to make a turn in one direction or the other, without any volition on the part of the driver of the vehicle, and merely by the action of certain parts of the steering apparatus when the same is operated for making a turn.

Another purpose of the invention is the provision of an electrical switch for displaying a signal at the rear or other part of a car, which switch will be engageable with a rotary control, which will be constant during a complete rotation of the steering wheel, or any desired number of revolutions thereof. The contact for closing the switch will be maintained, and the signal displayed, until the steering wheel is returned to a normal position.

Another object of the invention is to have the apparatus arranged so as to permit an initial free movement of the wheel in either direction, providing for a normal amount of play of the steering wheel and shaft, and without causing a flickering action of the signals.

Another purpose of the invention is the use of a duplicate switch apparatus, one of which is to be used in indicating a movement of the vehicle to the left of a straight ahead course, and the other to the right thereof.

As set forth herein the object is attained by the attachment to the steering column of an insulator cylinder or sleeve, upon which the movable switch devices are mounted, and the attachment to the hub of the steering wheel of the rotary parts by means of which the switches can be actuated. Wire connections extend within said insulator cylinder from the switch devices to the signals, and also to the battery for providing a current thereto. The signals may be in the form of lights or other visually discernible objects.

In addition to the mechanism hereinbefore referred to there is set forth herein a manually operated apparatus, by means of which the requirements of certain laws can be complied with, and a signal shown to indicate that a change in the direction of movement of a vehicle is to be made shortly thereafter.

The above named, and other features and advantages of the invention will more fully appear from the following specification, reference being had to the accompanying drawings, in which:

Fig. 1 shows the invention in front elevation, as it appears when in use, with some of the parts broken away to more fully disclose the same.

Fig. 2 is a cross-section on the broken line 2—2 of Fig. 1.

Fig. 3 is a cross-section on the line 3—3 of Fig. 1.

Fig. 4 is a view similar to Fig. 2, with the switch in an operative position.

Fig. 5 is a view similar to Fig. 1, showing a modified form of the invention.

The reference number 10 indicates the steering column of an automobile, in which is rotatably mounted a shaft 11, to the upper end of which is fixed the hub 12 of a steering wheel 13, of usual construction. Fxed to the hub 12 is a collar 14, forming an extension for a cylindrical casing 15, at the opposite end of which is a similar extension 16, capable of rotation on a bearing 17, fixed to the column 10. A rotary movement of the wheel 13 is imparted to the casing 15, giving a similar movement thereto, with a corresponding degree of turn.

Fixed to the inner face of the casing 15 is a pair of metal bands 18 and 19, provided with flanges 20 and 21, which form tracks for switch elements hereinafter set forth. Openings 22 and 23 are formed in said tracks, respectively, with the edges of the metal turned over to form wiper faces for dogs operating therein, and hereinafter described.

Fixed to the column 10 within the casing 15 is a sleeve 24, of fiber or other non-conducting material, and to the outer face of said sleeve is pivoted a pair of dogs 25 and 26, also of insulator material, and provided with pointed ends for engagement with the openings 22 and 23, and for a sliding action in one direction or the other on said tracks. The pivots of said dogs are in alignment with the axis of the shaft 11, and the operation of one of said dogs is identical with that of the other, but in a contrary direction, so that the operation of the upper dog 25, as shown in Fig. 1, will be first more particularly set forth.

Balance springs 28 and 29 connect the sides of the dog 25 with fiber blocks 30 at the sides thereof, tending to hold said dog with one or other of its end faces in contact with the track 20. For a left-hand turn the movement of the casing 15 and track 20 is anti-clockwise, as indicated in Fig. 2, and in such movement the opening 22 is engaged by the end of the dog 25, reversing the position of such dog, and changing it from a neutral or primary position, as shown in Fig. 2, to a secondary position, as in Fig. 4. In this position the end of the dog slides on the track 20, and the track and casing 15 can be given a complete rotation, if desired, following the movement of the steering wheel. In fact, any number of revolutions of the wheel will not affect the dog in its sliding relation with the track.

Secured to the sleeve 24 near the dog 25 is a contact arm 31, for engagement by a spring terminal 32, also fixed to the sleeve 24. In the movement of the dog 25 to a secondary position the dog forces the spring 32 downwardly into contact with the arm 31, closing a circuit through said arms and through wire connections shown at 33 and 34 to suitable signals for indicating a change of direction of the vehicle, and with the battery of the car to furnish current thereto. Said wires are shown extending downwardly in a channel 35 in the inner face of the sleeve 24. The contact of the spring 32 and arm 31 continues so long as the dog 25 is in such secondary position, and the signal is displayed as long as such condition continues, or until the steering wheel is returned to a straight-ahead position.

It will be noted that as shown in Fig. 2, for the primary position of the dog 25, there is a sufficient distance between said dog and the opening 22 to permit a limited movement of the steering wheel and band 18 without closing the switch. This will allow for the usual fluctuation in the movement of the wheel, and prevent a flickering action of the signals at times when no turn was to be made.

The signals may be of any conventional type, which can be visually discerned, and for a left turn both rear and front signals may be provided, and of a character that can be readily distinguished under conditions of darkness. The system can also be provided with pilot lights, at a point in the front of the vehicle to be easily seen by the driver, to show that the signals are operating.

The lower dog 26 is connected by springs 37 and 38 with blocks 39 of insulator material attached to the sleeve 24. The pointed end of the dog is thus held yieldably in slidable contact with the track 21, while moving thereon in one direction or the other. Said dog is adapted for operation by a movement of the casing 15 in a direction contrary to that indicated in Fig. 2, and in a direction of movement of the steering wheel in making a right turn. In the primary position of the dogs 25 and 26, as shown in said figure, the opening 23 in the track 21 is shown in broken lines, and is as far to one side of a line passing through the pivots of said dogs as the opening 22 is to the other side. In turning to the right the track 21 is permitted a limited amount of free movement before it engages the dog 26, which it does in the same manner as the operation of the dog 25 by the track 20. This causes a reversal of the position of the dog 26, and a slidable engagement of said dog with a spring arm 40, in circuit with the battery, and also with the system carrying a signal for indicating the right hand turn of the vehicle. The movement of the dog into a secondary position forces the arm 40 into contact with a plate 41, also connected with the signalling system, such contact closing the circuit and displaying the signal. Such contact and showing of the signal is continuous until the return of the steering wheel to a straight ahead position, as In the continued movement of the steering wheel to the right the dog 26 has a slidable contact with the track 21 permitting the wheel to be given any number of turns in that direction. In this movement the band 18 also turns in a clockwise direction, contrary to the movement shown in Fig. 2, and the track 20 merely slides beneath the end of the dog 25, for any distance.

In connecting the switches with the electrical system any desired number of wires can be employed, from either of said switches to the signal circuit, and battery.

In Fig. 5 is shown a form of the invention which is provided with additional safeguarding features, with a push-button control, making it possible to indicate for some distance before a change of direction is to be made that the same is contemplated. Under the requirements in some of the states it is necessary to do this, especially in the case of trucks and heavy vehicles. The general arrangement is the same as hereinbefore described, but the sleeve 24 is lengthened, and supported on the upper part is a plate 43, curved to fit the sleeve, and of modified U-form, within which is a smaller plate 44. Slidable on said plates is a pair of shoes 45 and 46, connected by wires 47 with a push-button 48 on the wheel 13. The plate 43 provides a connection between the shoe 45 and terminal plate 32, and the plate 44 a connection between the shoe 46 and terminal 31, and the pushing of the button 48 closes a circuit through said plates, causing the signal to be displayed. As soon as the steering wheel is turned sufficiently to cause a contact of the terminals 31 and 32 the signal is set permanently, and the push-button connection is relieved.

Connection can be made from the plates 43 and 44 to the electrical system, as at points $a$ and $b$, and wires extending through the fiber sleeve to said points and then to a connection with the signaling devices.

Mounted on the lower end of the sleeve 24 are similar plates 50 and 51, engaged by shoes 52 and 53 supported from the casing 15, and connected with a push-button switch 54 on the wheel 13. Connections are also made through said plates with connections for the terminals 40 and 41, and other connections made from points $c$ and $d$ by wires to the battery and other parts of the system. The pushing of the button 54 closes a circuit to indicate a right hand turn, and upon the contacts of the terminals 40 and 41 the push-button connection is relieved. This arrangement is only made use of when it is desired to make a turn at some distance ahead, and to warn a following driver of that fact. In all other cases the display of the signals is effected without any volition of the driver of the car, and with the personal element entirely eliminated, except so far as it is necessary to turn the steering wheel.

The casing 15 and bands 18 can be connected by screws 36, and an adjustment of said parts rotatably can be provided by means of slots in which the screws are positioned, as at 36ª. By loosening the screws the position of the band can be shifted so as to speed up the action of the switch, or defer the same, as desired.

Changes can be made in the form and arrangement of the various parts of the invention, without departing from the scope thereof, as set forth and claimed therein.

What I claim, and desire to secure by Letters Patent, is:

1. In combination with a steering apparatus having a stationary part and a part rotatable thereon, a casing attached to the rotatable part, and provided with a pair of circular tracks, a pair of switches secured to said stationary part and normally open, one of which is provided with connections with an apparatus to indicate a left hand turn, and the other of which is provided with connections with a right hand turn signal, a pair of oppositely disposed dogs pivoted on said stationary part adapted for the alternate selective closing of said switches, and means on said tracks for actuating said dogs.

2. In combination with the steering wheel of a motor vehicle and supporting column thereof, a casing fixed to said steering wheel, a pair of circular tracks in said casing each provided with a dog engaging means, a pair of oppositely disposed dogs pivoted to said column in slidable engagement with said tracks, and reversable in position by said means, a pair of switches supported on said column, normally open, and adapted to be closed by one or the other of said dogs, following initial movement thereof, connections between one of said switches and left hand turn indicating devices, connections between the other of said switches and a right hand turn indicating device, and means for holding said dogs yieldably in contact with said tracks, the movement of said steering wheel in one direction operating to actuate one of said dogs to indicate a turning movement of the car similar to that of the wheel, and the movement of the wheel in the opposite direction operating to actuate the other of said dogs, to close a switch and indicate the turning movement of the car in such other direction.

3. In combination with the steering wheel of an automobile and supporting column thereof, a casing connected with said steering wheel to rotate therewith, a circular track supported in said casing, an insulator sleeve fixed to said column within the casing, a normally open switch fixed to said sleeve, connections between said switch and a signal system on said vehicle, a dog pivoted to said sleeve, adapted to close said switch, and having a slidable engagement with said track, means for holding said dog in yieldable contact with said track in the movement of the track in one direction or the other, and means carried by said track for actuating said dog and closing said switch, said means being positioned at a point to permit a limited free movement of said track before the switch is closed.

4. In combination with the steering wheel of an automobile, and supporting column therefor, a casing connected with said wheel, a pair of circular tracks supported in said casing, an insulator sleeve fixed on said column, a pair of switches on said sleeve, normally open, a pair of dogs pivoted on said sleeve, adapted to close said switches, and having a slidable engagement with said tracks, means on said tracks for actuating said dogs, to close the switches, plates mounted on said sleeve in circuit with said switches, shoes supported in said casing in engagement with said plates, push-button switches on said steering wheel, and connections between said last-named switches and said shoes.

5. In combination with the steering wheel of an automobile, and supporting column thereof, a casing connected with said steering wheel to rotate therewith, a pair of circular tracks supported in said casing, a sleeve fixed to the column, normally open switches fixed to said sleeve, connections between said switches and a signal system on said vehicle, dogs pivoted to said sleeve adapted to close said switches alternatively, and having a slidable engagement with said tracks, means for holding said dogs in yieldable contact with said tracks in the movement of the tracks in one direction or the other, means carried by said tracks for actuating said dogs and closing said switches, said means being positioned at points to permit a limited free movement of the tracks before the switches are closed, and means for rotatable adjustment of said tracks to vary the degree of initial movement thereof.

ELMER C. HUSTON.